(12) United States Patent
Jensen et al.

(10) Patent No.: US 7,389,225 B1
(45) Date of Patent: Jun. 17, 2008

(54) METHOD AND MECHANISM FOR SUPERPOSITIONING STATE VECTORS IN A SEMANTIC ABSTRACT

(75) Inventors: Delos C. Jensen, Orem, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1172 days.

(21) Appl. No.: 09/691,629

(22) Filed: Oct. 18, 2000

(51) Int. Cl.
G06F 17/27 (2006.01)

(52) U.S. Cl. .................................. 704/9; 704/4
(58) Field of Classification Search ........... 704/4, 704/7, 9, 10
See application file for complete search history.

(56) References Cited

U.S. PATENT DOCUMENTS

| | | | |
|---|---|---|---|
| 5,276,677 A | 1/1994 | Ramamurthy et al. | 370/60 |
| 5,278,980 A | 1/1994 | Pedersen et al. | |
| 5,317,507 A | 5/1994 | Gallant | 707/532 |
| 5,325,298 A | 6/1994 | Gallant | 704/9 |
| 5,390,281 A | 2/1995 | Luciw et al. | |
| 5,539,841 A | 7/1996 | Huttenlocher et al. | 382/218 |
| 5,551,049 A | 8/1996 | Kaplan et al. | 707/532 |
| 5,619,709 A | 4/1997 | Caid et al. | 395/794 |
| 5,675,819 A | 10/1997 | Schuetze | 704/10 |
| 5,694,523 A | 12/1997 | Wical | 706/45 |
| 5,696,962 A | 12/1997 | Kupiec | 395/604 |
| 5,708,825 A | 1/1998 | Sotomayor | 395/762 |
| 5,721,897 A | 2/1998 | Rubinstein | 707/2 |
| 5,778,362 A | 7/1998 | Deerwester | 707/5 |
| 5,778,378 A | 7/1998 | Rubin | 707/103 |
| 5,778,397 A | 7/1998 | Kupiec et al. | 707/500 |
| 5,794,178 A | 8/1998 | Caid et al. | 704/9 |
| 5,799,276 A * | 8/1998 | Komissarchik et al. | 704/251 |
| 5,822,731 A | 10/1998 | Schultz | 704/256 |
| 5,832,470 A | 11/1998 | Morita et al. | |
| 5,867,799 A | 2/1999 | Lang et al. | 707/1 |
| 5,873,056 A | 2/1999 | Liddy et al. | 704/9 |
| 5,934,910 A | 8/1999 | Ho et al. | 434/362 |
| 5,937,400 A | 8/1999 | Au | |
| 5,940,821 A | 8/1999 | Wical | 707/3 |
| 5,963,965 A | 10/1999 | Vogel | 707/501.1 |
| 5,966,686 A | 10/1999 | Heidorn et al. | 704/9 |
| 5,970,490 A | 10/1999 | Morgenstern | 707/10 |
| 5,974,412 A | 10/1999 | Hazlehurst et al. | 707/3 |
| 5,991,713 A | 11/1999 | Unger et al. | 704/9 |
| 6,006,221 A | 12/1999 | Liddy | |
| 6,009,418 A | 12/1999 | Cooper | 706/15 |
| 6,078,953 A | 6/2000 | Vaid et al. | 709/223 |
| 6,085,201 A | 7/2000 | Tso | |

(Continued)

OTHER PUBLICATIONS

Noam Chomsky, "Language and Thought," 1993, pp. 18-19, 22-27, 44-45, 60-61.

(Continued)

*Primary Examiner*—Michael N. Opsasnick
(74) *Attorney, Agent, or Firm*—Marger, Johnson & McCollom, P.C.

(57) ABSTRACT

State vectors representing the semantic content of a document are created. The state vectors are superpositioned to construct a single vector representing a semantic abstract for the document. The single vector can be normalized. Once constructed, the single vector semantic abstract can be compared with semantic abstracts for other documents to measure a semantic distance between the documents, and can be used to locate documents with similar semantic content.

21 Claims, 6 Drawing Sheets

U.S. PATENT DOCUMENTS

| | | | |
|---|---|---|---|
| 6,097,697 | A | 8/2000 | Yao et al. |
| 6,105,044 | A | 8/2000 | De Rose et al. |
| 6,108,619 | A | 8/2000 | Carter et al. ............... 704/9 |
| 6,122,628 | A | 9/2000 | Castelli |
| 6,173,261 | B1 | 1/2001 | Arai et al. ................. 704/257 |
| 6,205,456 | B1 | 3/2001 | Nakao ....................... 707/531 |
| 6,289,353 | B1 | 9/2001 | Hazlehurst et al. ......... 707/102 |
| 6,295,533 | B2 | 9/2001 | Cohen |
| 6,297,824 | B1 | 10/2001 | Hearst et al. |
| 6,311,194 | B1 | 10/2001 | Sheth et al. ................ 707/505 |
| 6,317,708 | B1 | 11/2001 | Witbrock et al. ............ 704/9 |
| 6,356,864 | B1 | 3/2002 | Foltz et al. .................. 704/1 |
| 6,363,378 | B1 | 3/2002 | Conklin et al. |
| 6,459,809 | B1 | 10/2002 | Jensen et al. ............... 382/203 |
| 6,470,307 | B1 | 10/2002 | Turney ....................... 704/9 |
| 6,493,663 | B1 | 12/2002 | Ueda |
| 6,513,031 | B1 | 1/2003 | Fries et al. ................... 707/3 |
| 6,523,026 | B1 * | 2/2003 | Gillis .......................... 707/3 |
| 6,615,208 | B1 * | 9/2003 | Behrens et al. .............. 707/5 |
| 6,675,159 | B1 * | 1/2004 | Lin et al. ..................... 707/3 |

OTHER PUBLICATIONS

Jonathan Culler, "Ferdinand de Saussure—Revised Edition," 1986, pp. 38-57.

Umberto Eco, Marco Santambrogio and Patrizia Violi (Editors), "Meaning and Mental Representations," 1988, p. 221.

Donald W. Kahn, "Topology—An Introduction to the Point-Set and Algebraic Areas," 1978, pp. 10-15.

Paul R. Halmos, "Naïve Set Theory," 1960, pp. 56-57, 66-69.

John G. Hocking and Gail S. Young, "Topology," 1961, pp. 6-7, 56-59, 68-71.

Umberto Eco, "Semiotics and the Philosophy of Language," 1984, pp. 46-87.

Noam Chomsky, "The Minimalist Program," 1995, pp. 13-65.

R. E. Edwards, "Functional Analysis-Theory and Applications," 1965, pp. 10-13, 32-33, 50-53, 62-65, 88-103, 174-203, 224-233.

*Applications of Functional Analysis and Operator Theory*, V. Hutson, J.S. Pym, 1980, table of contents, preface and index.

Latent Sematic Indexing is an Optimal Special Case of Multidimensional Scaling, Brian T. Bartell, Garrison W. Cottrell, Richard K. Belew, pp. 161-167, 1992; ACM 0-89791-524-0.

Improvintg Relevance Feedback in the Vector Space Model, Carol Lundquist, David A. Grossman, Ophir Frieder, 1997, pp. 16-23; ACM 0-89791-970-X.

A Multilevel Apprach to Intelligent Information Filtering: Model, System, and Evaluation, J. Mostafa, S. Mukhopadhyay, W. Lam, M. Palakal, ACM Transactions On Information Systems, vol. 15, No. 4, Oct. 1997, pp. 368-399.

Capturing the State of Distributed Systems with XML, Rohit Khare and Adam Rifkin, Oct. 26, 1997, pp. 1-12.

Semantic Information Retrieval, Annelise Mark Pejtersen, pp. 90-92, Communications of the ACM, Apr. 1998/vol. 41, No. 5.

Unifying Heterogeneous Information Models, Narinder Singh, pp. 37-44, Communications of the ACM, May 1998/vol. 41, No. 5.

Platform for Internet Content Selection (PICS), Jan. 3, 1998, http://www.w3.org/pics/.

Intelligent Collaboration & Visualization, pp. 1-16.

Cognitive Science Laboratory at Princeton University, "WordNet—A Lexical Database for English," printed Feb. 10, 2000, selected pages from website.

George W. Smith, "Computers and Human Language," 1991, pp. 204-257.

Vivian Cook and Mark Newson, "Chomsky's Universal Grammar—An Introduction," 1988, pp. 40-74, 131-272.

David Pesetsky, "Zero Syntax Experiencers and Cascades," 1995, pp. 1-122.

Platform for Internet Content Selection (PICS), Jan. 3, 1998, http://www.w3.org/pics/.

Intelligent Collaboration & Visualization, pp. 1-16.

Bartell, et al., "Latent Semantic Indexing is an Optimal Special Case of Multidimensional Scaling," *Dept. of Computer Science & Engineering, University of California, San Diego,* 1992, 7 pages.

Chomsky, "*Language and Thought,*" 1993, pp. 18-19, 22-27, 44-45, 60-61.

Chomsky, "*The Minimalist Program,*" 1995, pp. 13-65.

Cook et al., "*Chomsky's Universal Grammar—An Introduction,*" 1988, pp. 40-74, 131-272.

Culler, "*Ferdinand de Saussure—Revised Edition,*" 1986, pp. 38-57.

Eco et al., "*Meaning and Mental Representations,*" 1988, p. 221.

Eco, "*Semiotics and the Philosophy of Language,*" 1984, pp. 46-86.

Edwards, "Functional Analysis; theory and applications," 1965, pp. 10-13, 32-33, 50-53, 62-65, 88-103, 174-203, 224-233.

Halmos, "*Naïve Set Theory,*" Undergraduate Texts in Mathematics, 1968, pp. 56-57, 66-69.

Hocking, "Topology,", 1961, pp. 6-7, 56-59, 68-71.

Hutson, "*Applications of Functional Analysis and Operator Theory,*" 1980, index, preface, and Table of Contents.

Kahn, "*Topology: An Introduction to the Point-Set and Algebraic Areas,*" 1975, pp. 10-15.

Khare et al., "*Capturing the State to Distributed Systems with XML,*" Oct. 26, 1997, pp. 1-12.

Lundquist et al., "*Improving Relevance Feedback in the Vector Space Model,*" 1997, pp. 16-23.

Mostafa et al., "A Multilevel Approach to Intelligent Information Filtering: Model, System, and Evaluation," *ACM Transaction on Information Systems,* vol. 15, No. 4, Oct. 1997, pp. 368-399..

Pesetsky, "*Zero Syntax: experiencers and cascades,*" 1995, pp. 1-122.

Pejtersen, "Semantic Information Retrieval," *Communications of the ACM,* vol. 41, No. 5, Apr. 1998, pp. 90-92.

"*Platform for Internet Content Selection (PICS),*" http://www.w3.org. pp. 1-8.

Singh, "Unifying Heterogeneous Information Models," *Tesserae Information Systems, Inc.,* http://citeseer.ist.psu.edu.com, pp. 1-13.

Smith, "*Computers and human language,*" 1991, pp. 205-257.

"WordNet—a lexical database for the English language," *Cognitive Science Laboratory, Princeton University,* www.cogsci.princeton.edu, 2 pgs.

Onyshkevych and Nirenburg; "*A Lexicon for Knowledge-Based MT* "; Undated (pp. 1-49), 1996.

Mahesh; "*Ontology Development for Machine Translation: Ideology and Method*"; Computing Research Laboratory, New Mexico State University; Undated (87 pages), 1996.

\* cited by examiner

US 7,389,225 B1

METHOD AND MECHANISM FOR SUPERPOSITIONING STATE VECTORS IN A SEMANTIC ABSTRACT

RELATED APPLICATION DATA

This application is a continuation-in-part of co-pending U.S. patent application Ser. No. 09/615,726, titled "A METHOD AND MECHANISM FOR THE CREATION, MAINTENANCE, AND COMPARISON OF SEMANTIC ABSTRACTS," filed Jul. 13, 2000, which is a continuation-in-part of U.S. Pat. No. 6,108,619, titled "METHOD AND APPARATUS FOR SEMANTIC CHARACTERIZATION," issued Aug. 22, 2000, and of co-pending U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, all commonly assigned.

FIELD OF THE INVENTION

This invention pertains to determining the semantic content of documents via computer, and more particularly to comparing the semantic content of documents to determine similarity.

BACKGROUND OF THE INVENTION

U.S. patent application Ser. No. 09/615,726, titled "A METHOD AND MECHANISM FOR THE CREATION, MAINTENANCE, AND COMPARISON OF SEMANTIC ABSTRACTS." filed Jul. 13, 2000, referred to as "the Semantic Abstract application" and incorporated by reference herein, describes a method and apparatus for creating and using semantic abstracts for content streams and repositories. Semantic abstracts as described in the Semantic Abstracts application include a set of state vectors. Thus, storing the semantic abstract requires storing each vector in the set, taking up a lot of storage space. Further, measuring the distance between a semantic abstract and a summary of a document using the Hausdorff distance function, a complicated function, requires numerous calculations along the way to calculate a single distance.

The Semantic Abstract application discusses techniques for simplifying the semantic abstract (e.g., by generating a centroid vector). Such techniques have limitations, however; most notably that particular information can be lost.

Accordingly, a need remains for a way to construct a single vector that captures the meaning of a semantic context represented by a clump of vectors without losing any information about the semantic context.

SUMMARY OF THE INVENTION

The invention is a method and apparatus constructing a single vector representing a semantic abstract in a topological vector space for a semantic content of a document. The semantic content is constructed for the document on a computer system. From the semantic content, lexemes or lexeme phrases are identified. State vectors are constructed for the lexemes/lexeme phrases. The state vectors are superpositioned into a single vector, which forms the semantic abstract for the document.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
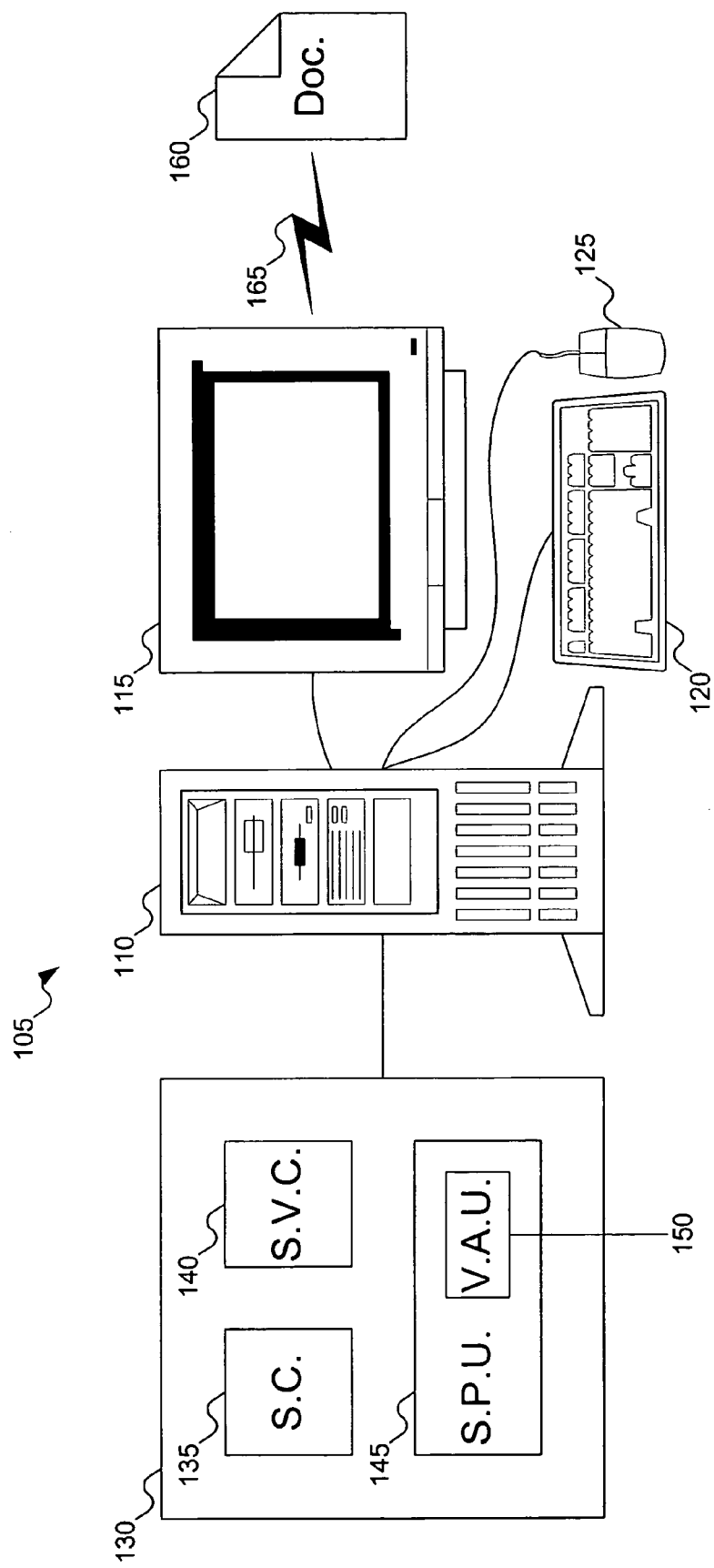
FIG. 1 shows a computer system on which the invention can operate to construct a single vector semantic abstract.

FIG. 1 shows a computer system 105 on which a method and apparatus for using a multi-dimensional semantic space can operate. Computer system 105 conventionally includes a computer 110, a monitor 115, a keyboard 120, and a mouse 125. Optional equipment not shown in FIG. 1 can include a printer and other input/output devices. Also not shown in FIG. 1 are the conventional internal components of computer system 105: e.g., a central processing unit, memory, file system, etc.

Computer system 105 further includes software 130. In FIG. 1, software 130 includes semantic content 135, state vector constructor 140, and superposition unit 145. State vector constructor 140 takes lexemes and lexeme phrases from semantic content 135 and constructs state vectors for the lexemes/lexeme phrases in a topological vector space. Superposition unit 145 takes the state vectors constructed by state vector constructor 140 and superpositions them into a single vector for the semantic abstract. In the preferred embodiment, superposition unit 145 includes vector algebra unit 150. Vector algebra unit 150 adds the state vectors together to construct the single vector for the semantic abstract.

Although the above description of software 130 creates a single vector from state vectors in the topological vector space, the state vectors can be divided into groups, or clumps. This produces a minimal set of state vectors, as opposed to a single vector, which avoids distant lexemes/lexeme phrases from being superpositioned and losing too much context.

Figure 6:
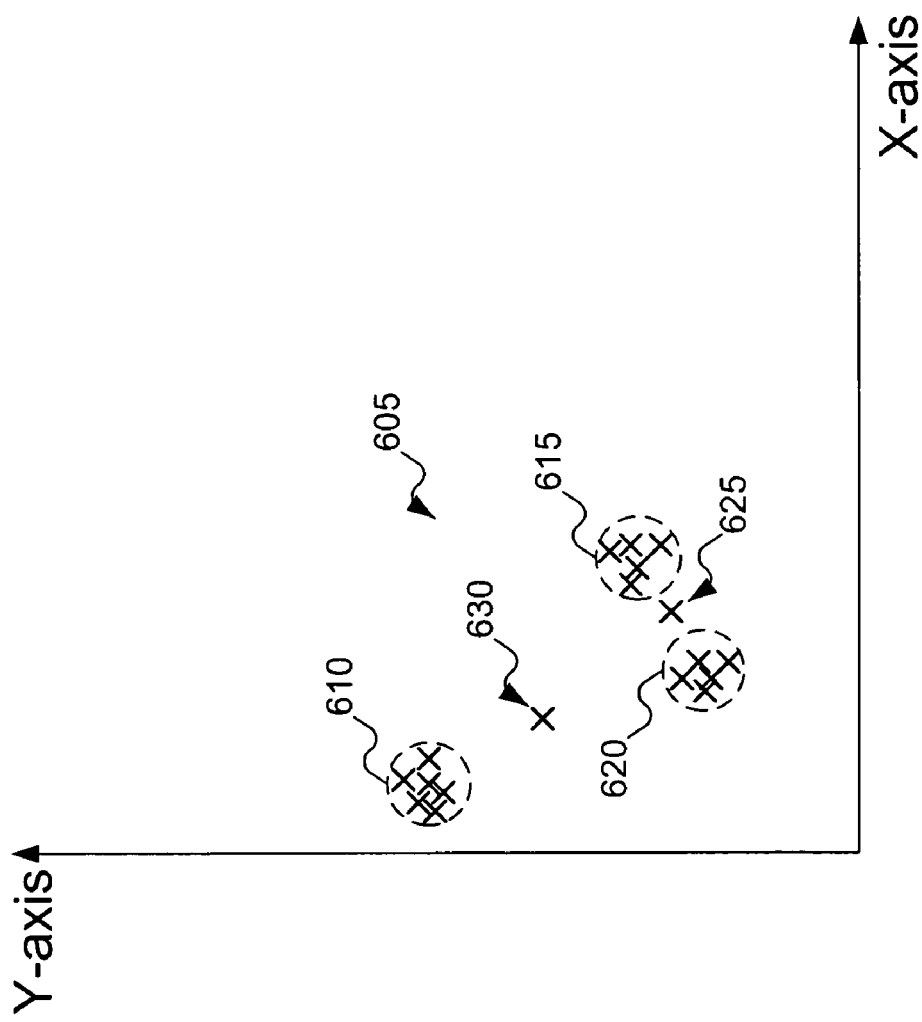
FIG. 6 shows a two-dimensional topological vector space in which state vectors have been clumped.

In the preferred embodiment, clumps are located by performing vector quantization, which determines a distance between each pair of state vectors; vectors sufficiently close to each other can then be clumped together. For example, a vector can be determined to be in a clump if its distance is no greater than a threshold distance to any other vector in the clump. FIG. 6 shows a two-dimensional topological vector space in which state vectors have been clumped. In FIG. 6, state vectors 605 have been grouped into three clumps 610, 615, and 620. The state vectors in each of clumps 610, 615, and 620 can then be superpositioned as described below, and the resulting three vectors grouped into a semantic abstract. Note that, in FIG. 6, not every state vector is part of a clump. For example, state vector 625, although close to vectors in both of clumps 615 and 620, is not sufficiently close to all of the vectors in either clump, and is excluded from both. Similarly, vector 630 is too far from any clump to be included, and is excluded from all clumps.

A person skilled in the art will recognize that other techniques can be used to locate clumps: for example, by dividing the vectors in groups so that each vector in a particular group has an angle within a certain range. The remainder of this invention description assumes that the state vectors form only a single clump and vector quantization is not required; a person skilled in the art will recognize how the invention can be modified when vector quantization is used.

Although the document from which semantic content 135 is determined can be found stored on computer system 105, this is not required. FIG. 1 shows computer system 105 accessing document 160 over network connection 165. Network connection 165 can include any kind of network connection. For example, network connection 165 can enable computer system 105 to access document 160 over a local area network (LAN), a wide area network (WAN), a global internetwork, a wireless network or broadcast network, or any other type of network. Similarly, once collected, the semantic abstract can be stored somewhere on computer system 105, or can be stored elsewhere using network connection 165.

Figure 2:
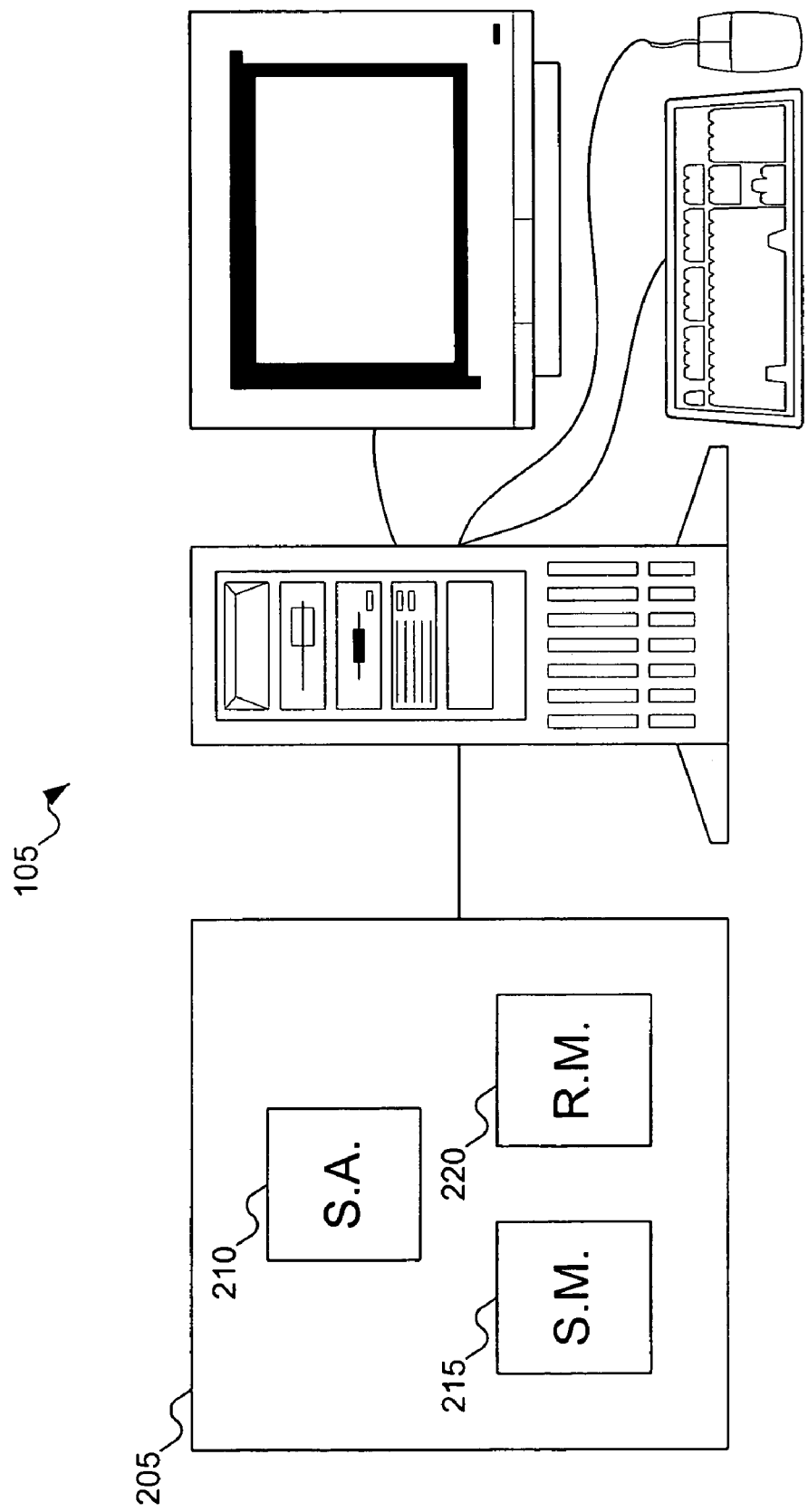
FIG. 2 shows a computer system on which the invention can operate to search for documents with content similar to a given semantic abstract.

FIG. 2 shows computer system 105 programmed with a different software package. In FIG. 2, computer system 105 includes software 205 to use semantic abstract 210 to find documents with similar content. Search means 215 searches the topological vector space for documents with semantic abstracts that are "similar" to semantic abstract 210. In the preferred embodiment, search means 215 is implemented as software to query the vector space for semantic abstracts close to the single vector in semantic abstract 210. What semantic abstracts qualify as "similar" to a given semantic abstract will be revisited with reference to FIG. 4 below. Retrieval means 220 retrieves the documents with semantic abstracts in the topological vector space similar to semantic abstract 210.

On the Meaning of the Meaning of Meaning

Recall the definition of a vector space. A nonempty set V is said to be a vector space over a field F if V is an abelian group under an operation denoted by +, and if for every $\alpha, \beta \in F$, v, w $\in V$ the following are satisfied:

$$\alpha(v+w)=\alpha v+\alpha w$$

$$(\alpha+\beta)v=\alpha v+\beta v$$

$$\alpha(\beta v)=(\alpha\beta)v$$

$$1v=v$$

where "1" represents the unit element of F under multiplication.

As shown in co-pending U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, a set S of lexemes can be represented as a vector space. This representation is accomplished by introducing a topology $\tau$ on S that is compatible with the sense of the lexemes, building a directed set from the lexemes, and then (given the separation axioms) showing an explicit one-to-one, continuous, open mapping $\theta$ from S to a subspace of the Hilbert coordinate space—a de facto vector space. This open mapping $\theta$ is continuous and open with respect to $\tau$, of course.

How is $\theta$ expressed? By the coordinate functions $g_k$: S $\rightleftharpoons I^1$. And how are the $g_k$ defined? By applying Urysohn's lemma to the $k^{th}$ chain of the directed set, where A={S−root}, B=$\overline{n_m}$ (the closure of the minimal node of the chain), and the intermediate nodes of the chain take the role of the separating sets (used to define the function predicted by Urysohn's lemma) C(r/2"), U(r/2"). (Of course in practice the continuous functions $g_k$ can only be approximated with step functions, the resolution being constrained by the chain length.) In other words, the $k^{th}$ chain provides a natural mechanism for defining $g_k$. Or to put it another way the $k^{th}$ chain identifies $g_k$.

As is well known, functions that are nicely behaved can form a vector space, and it so happens that step functions are very well behaved indeed. Consider the vector space Q spanned by the coordinate functions $g_k$, where q$\in$Q is of the form $\Sigma\lambda_k g_k$, $\lambda_k \in \mathbf{R}$(the real numbers). Define an inner product on Q, of the form $<q_1, q_2>=\int q_1 \cdot q_2$, where it is understood that we integrate over S in a topologically consistent manner.

Given an inner product space Q, Q is a function space. In fact, Q is the function space spanned by the functions $g_k$. The functions $g_k$ are defined by their corresponding chains. In fact the $k^{th}$ chain uniquely identifies $g_k$, so that $\{g_k\}$ is more than simply a spanning set; it is a basis of Q.

Having built the metric space Q in such a way as to entail the topology on S, the next step is to coherently leverage S into a metric space via Q's structure. With the two metrics (of S and Q) commensurable, the goal of quantifying the notion of near and far in S will be accomplished.

By definition, if V is a vector space then its dual space is Hom(V, F). Hom(V, F) is the set of all vector space homomorphisms of V into F, also known as the space of linear functionals. So, the dual of Q (i.e., Hom(Q, $\mathbf{R}$)) is a function space on a function space.

Now, consider that for any s$\in$S, the function $\epsilon_s$ associates the function $g_k$ with an element of the real field: $\epsilon_s(g_k)=g_k(s)$. A simple check shows linearity, i.e., $\epsilon_s(g_k+g_n)=(g_k+g_n)(s)=g_k(s)+g_n(s)=\epsilon_s(g_k)+\epsilon_s(g_n)$. The reader can similarly verify scalar multiplication. So, what does this show? It shows that every element of S corresponds to an element of the dual of Q. The notations $\epsilon_s(g_k)$ and $s(g_k)$ are used interchangeably.

Now the notion of the dual of Q is "properly restricted" (limited to a proper subspace) to those linear functionals in the span of S: $\Sigma\lambda_k s_k$, $\lambda_k \in \mathbf{R}$, where it is understood that $(\lambda_i s_i + \lambda_j s_j)g_k = \lambda_i s_i(g_k) + \lambda_j s_j(g_k)$. When properly restricted, it can be shown that Q and its dual are isomorphic. Indeed, for the finite dimensional case it is very easy to prove that a vector space and its dual are isomorphic. So the dimension of the dual space of Q—i.e., the dimension of the space spanned by S in its new role as a set of linear functionals—is equal to the dimension of Q. And what does the linear functional s "look" like? Well, s is the linear functional that maps $g_1$ to $g_1(s)$, $g_2$ to $g_2(s)$, . . . and $g_k$ to $g_k(S)$. In other words, metrized s=($g_1(s)$, $g_2(s)$, . . . $g_k(s)$, . . . ). This last expression is nothing more or less than the result of the Construction application. But notice: deriving the result this way requires constructing the dual of Q, characterized as $\tau\lambda_k s_k$, $\lambda \in \mathbf{R}$, s$\in$S. In other words, the expression $(\lambda_i s_i + \lambda_j s_j)$ now has meaning in a way that is consistent with the original topology $\tau$ defined on S. The last statement above is the keystone for much that is to be developed below.

The point of all this discussion is that simple algebraic operations on the elements of S, namely vector addition and scalar multiplication, can be confidently done.

On the Plausibility of the Norm $\|q\|=\int |q|$

A general line of attack to show that the metrics of S and Q are commensurable is to look for a norm on Q: a norm defined by the notion of the integral $\int |q|$ with respect to the topology $\tau$ on S. To firm up this notion, consider the following points:

Do the elements of Q={q:S$\rightarrow$R, q=$\Sigma\lambda_k g_k$} have compact support: that is, do the elements of Q map to a non-zero value in R? Yes, because $g_k$ is presumably continuous and open in some extension S' of S and some refinement $\tau'$ of $\tau$; S' being some kind of ultimate lexicon.

Is $\epsilon_s$ a positive Radon measure (a measure from utility theory)? Yes. Informally, one might consider any sequence of compact sets $C_k$ where $\cap C_k = s$, where s is interior to $C_k$. The characteristic functions $X_{Ck}$ converge weakly (in the dual):

$$\varepsilon_s(q) = \lim_{k \to \infty} q(s) X_{Ck}(s).$$

The linear form $\epsilon_s$ is often called the Dirac measure at the point s. Note that we have implicitly adopted the premise that S is locally compact.

Given a positive Radon measure $\mu$ on S, $\mu$ can be extended to the upper integral $\mu^*$ for positive functions on S. This leads to the definition of a semi-norm for functions on S, which in turn leads to the space $\mathscr{L}^1$ (S, $\mu$) (by completing Q with respect to the semi-norm). The norm on $\mathscr{L}^1$ (S, $\mu$) then reflects back (via duality) into S as $\|s\| = \lim \int |q \, X_{Ck}|$.

Note that if Q is convex, then S spans a set that sits on the convex hull of Q, just as one would expect that the so-called "pure" states should.

The point of all this discussion is that simple algebraic operations on the elements of S that are metric preserving can now be confidently performed: namely vector addition and scalar multiplication.

On the Nature of the Elements of S

Consider the lexemes $s_i$="mother" and $s_j$="father." What is $(s_i + s_j)$? And in what sense is this sum compatible with the original topology $\tau$?

$(s_i + s_j)$ is a vector that is very nearly co-linear with $s_n$="parent," and indeed "parent" is an element (of the dual of Q) that is entailed by both "mother" and "father." One might say that $s_n$ carries the potential to be instantiated as either $s_i$ or $s_j$. Viewing the elements of S as state vectors, and adducing from this (and other examples), it becomes apparent that vector addition can be interpreted as corresponding to a superposition of states.

While the vector sum "mother"+"father" intuitively translates to the concept of "parent," other vector sums are less intuitively meaningful. Nevertheless, vector summation still operates to combine the vectors. What is "human"+"bird"? How about "turtle"+"electorate"? Even though these vector sums do not translate to a known concept in the dictionary, if the object is to combine the indicated vectors, superposition operates correctly.

Consider the (preliminary) proposition that the sum of two state vectors corresponds to the superposition of the states of the addends. If state vector addition corresponds to superposition of states, the question then naturally comes to mind, "What happens when we superpose a state with itself?" Ockham's razor suggests that the result of such an operation should yield the same state. From this we conjecture that if a state vector corresponding to a state is multiplied by any non-zero scalar, the resulting state vector represents the same state. Put more succinctly, semantic state is entailed in the direction of the state vector.

Determining Semantic Abstracts

Figure 3:
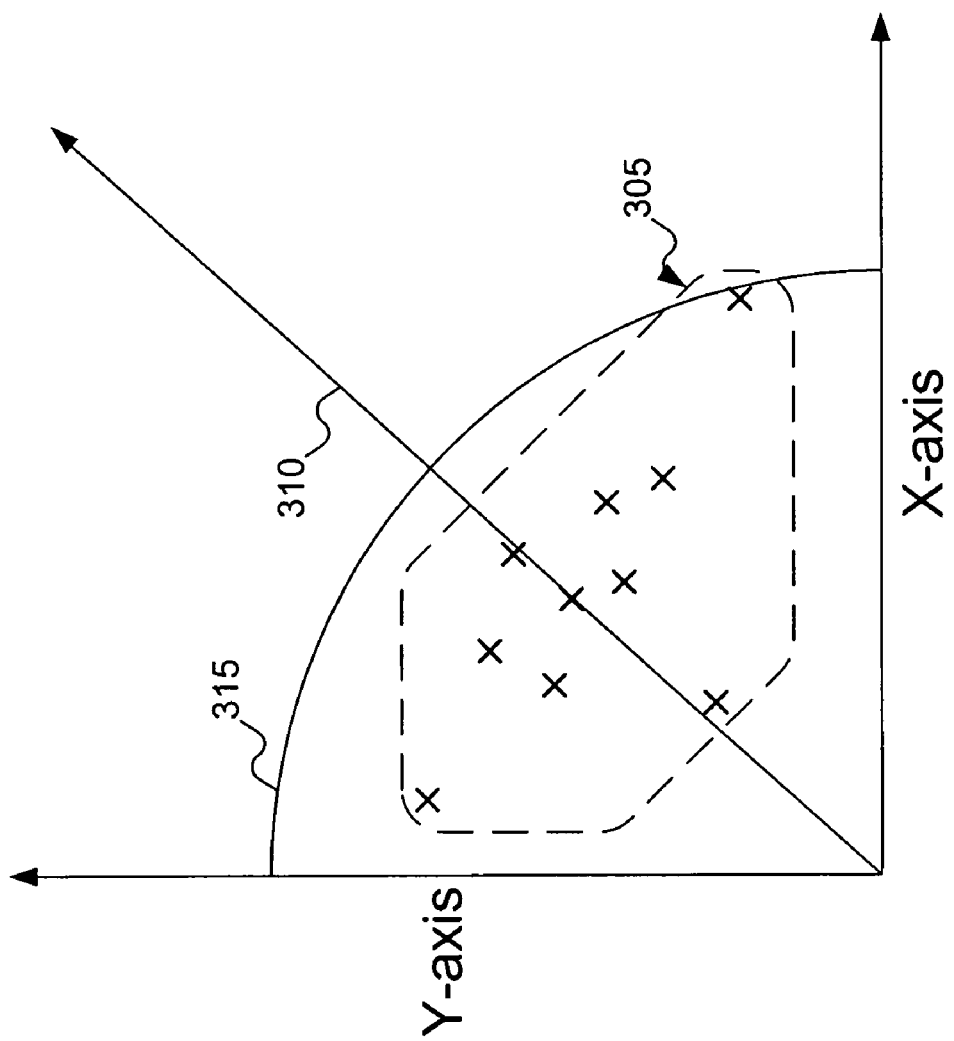
FIG. 3 shows a two-dimensional topological vector space in which state vectors are used to determine a semantic abstract for a document.

Now that superposition of state vectors has been shown to be feasible, one can construct semantic abstracts representing the content of the document as a vector within the topological vector space. FIG. 3 shows a two-dimensional topological vector space in which state vectors are used to determine a semantic abstract for a document. (FIG. 3 and FIG. 4 to follow, although accurate representations of a topological vector space, are greatly simplified for example purposes, since most topological vector spaces will have significantly higher dimensions.) In FIG. 3, the "x" symbols locate the heads of state vectors for terms in the document. (For clarity, the line segments from the origin of the topological vector space to the heads of the state vectors are eliminated.) Most of the state vectors for this document fall within a fairly narrow area of semantic content 305 in the topological vector space. Only a few outliers fall outside the core of semantic content 305.

The state vectors in semantic content 305 are superpositioned to form the semantic abstract. By taking the vector sum of the collected state vectors (the state vectors within semantic content 305), a single state vector 310 can be calculated as the semantic abstract.

Unit circle 315 marks all the points in the topological vector space that are a unit distance from the origin of the topological vector space. (In higher dimensional topological vector spaces, unit circle 315 becomes a unit hyper-sphere.) State vector 310 can be normalized to a unit distance (i.e., the intersection of state vector 310 and unit circle 315). Normalizing state vector 310 takes advantage of the (above-discussed) fact that semantic state is indicated by vector direction, and can compensate for the size of semantic content 305 used to construct state vector 310. One way to normalize state vector 310 is to divide the vector by its length: that is, if v is a state vector, $v/\|v\|$ is the unit vector in the direction of v.

Measuring Distance between State Vectors

As discussed above, semantic state is entailed by the direction of the state vector. This makes sense, as the vector sum of a state with itself should still be the same state. It therefore makes the most sense to measure the distance between semantic abstract state vectors through the angle between the state vectors. In the preferred embodiment, distance is measured as the angle between the state vectors.

Distance can be measured as the distance between the heads of the state vectors. But recall that changing the length of two state vectors will change the distance between their heads. Since semantic state is entailed by the direction of the state vector, state vectors can be normalized without affecting their states before measuring distance as the difference of state vectors. Normalizing the state vectors allows a given distance between vectors to have a consistent meaning across different bases and state vectors.

Figure 4:
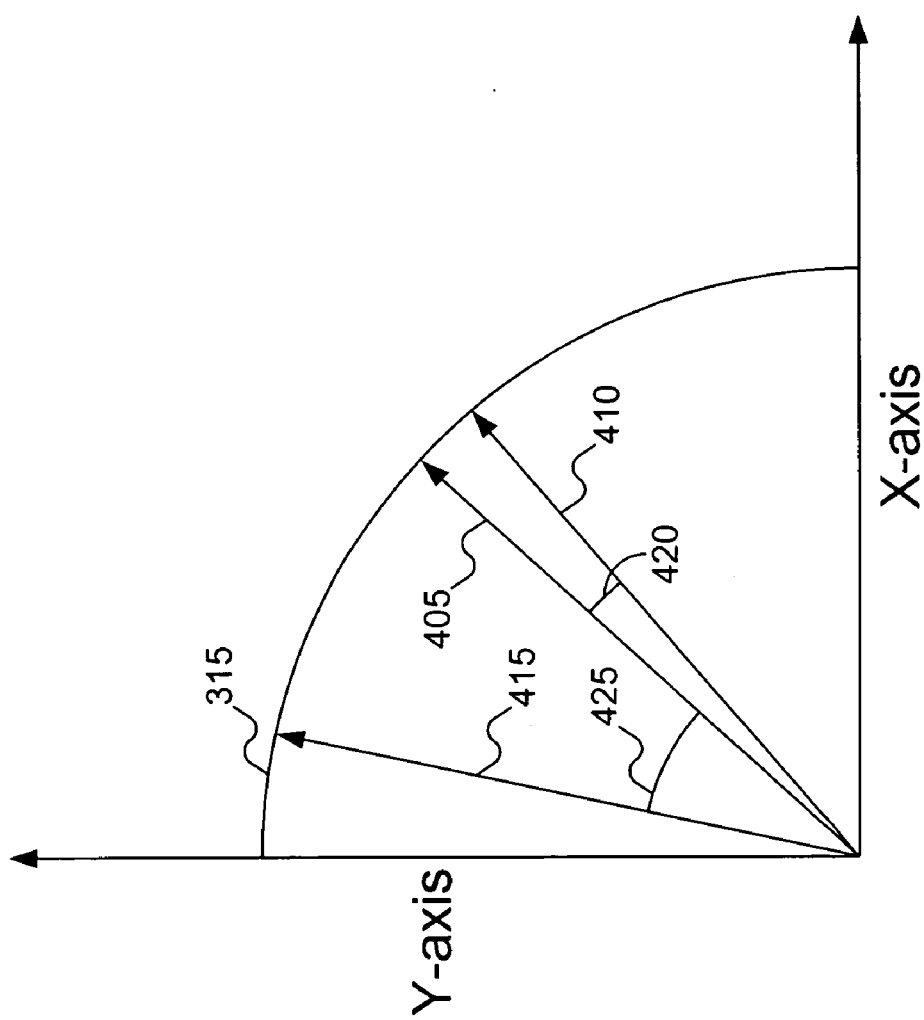
FIG. 4 shows a two-dimensional topological vector space in which semantic abstracts for three documents are compared.

FIG. 4 shows a two-dimensional topological vector space in which semantic abstracts for three documents are compared. In FIG. 4, three semantic abstracts represented as single state vectors 405, 410, and 415 are shown. Semantic abstract 405 (normalized from state vector 310 in FIG. 3) is the semantic abstract for the known document; semantic abstracts 410 and 415 are semantic abstracts for documents that may be similar to the document associated with semantic abstract 405. (Note that semantic abstracts 410 and 415 are also normalized.) Recall that distance can be measured as the angle between state vectors. The angle 420 between semantic abstracts 405 and 410 is relatively small, suggesting the two documents have similar content. In contrast, the angle 425 between semantic abstracts 405 and 415 is relatively large, suggesting the two documents have differing content.

Procedural Implementation

Figure 5:
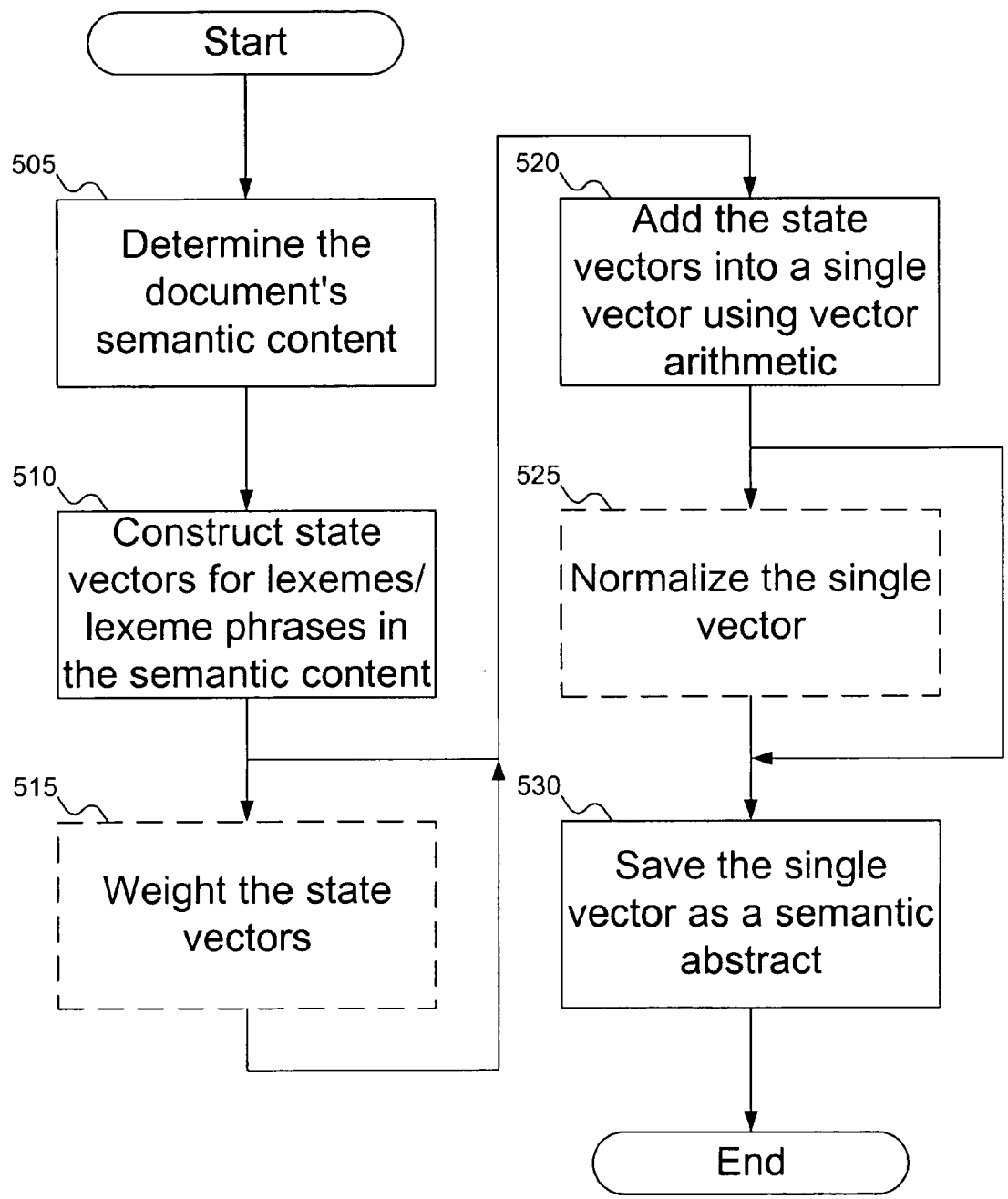
FIG. 5 is a flowchart of a method to construct a single vector semantic abstract for a document in the system of FIG. 1.

FIG. 5 is a flowchart of a method to determine a semantic abstract for a document in the system of FIG. 1. At step 505, the document's semantic content is determined. The semantic content of the document can be determined by using dominant vectors or dominant phrase vectors, as described in the Semantic Abstract application. (As further described in the Semantic Abstract application, after the vectors are constructed, they can be filtered to reduce the number of vectors factored into constructing the single vector for the semantic abstract.) At step 510, state vectors are constructed for each lexeme/lexeme phrase in the semantic content. At step 515, the state vectors are weighted, for example by multiplying the vectors with scaling factors. At step 520, the state vectors are superpositioned into a single vector using vector arithmetic. At step 525, the single vector is normalized. Finally, at step 530, the single vector is saved as the semantic abstract for the document.

Note that steps 515 and 525 are both optional. For example, the state vectors do not have to be weighted. Weighting the state vectors makes possible minimizing the weight of lexemes that are part of the semantic content but less significant to the document. And normalizing the single vector, although highly recommended, is not required, since distance can be measured through angle.

The advantage of superpositioning the state vectors into a single vector is that the amount of storage required to store the semantic abstract. Whereas in the Semantic Abstract application, storing the semantic abstract requires storing several multi-dimensional state vectors, the invention only requires storing one multi-dimensional state vector. And, as shown above, because superpositioning state vectors does not lose information, storing the single state vector is as complete as storing the individual state vectors before superposition.

The above-described embodiments of the invention can be implemented as software stored on a computer readable medium. The program can then be operated on a computer to execute the software.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A computer-implemented method for constructing a single vector representing a semantic abstract in a topological vector space for a semantic content of a document on a computer system, the method comprising:
   storing a semantic content for the document in computer memory accessible by the computer system;
   identifying a directed set of concepts as a dictionary, the directed set including a maximal element at least one concept, and at least one chain from the maximal element to every concept;
   selecting a subset of the chains to form a basis for the dictionary;
   identifying lexemes/lexeme phrases in the semantic content;
   measuring how concretely each lexemes/lexeme phrase is represented in each chain in the basis and the dictionary;
   constructing state vectors in the topological vector space for the semantic content using the measures of how concretely each lexemes/lexeme phrase is represented in each chain in the dictionary and the basis;
   superpositioning the state vectors to construct the single vector; and
   comparing the single vector with a second semantic abstract for a second document to determined whether the second document is semantically close to the document.

2. A method according to claim 1, wherein superpositioning the state vectors includes adding the state vectors using vector arithmetic.

3. A method according to claim 1, wherein superpositioning the state vectors includes weighting the state vectors.

4. A method according to claim 1 further comprising normalizing the single vector.

5. A method according to claim 1, wherein:
   storing a semantic content includes:
      storing the document in computer memory accessible by the computer system; and
      extracting words from at least a portion of the document;
   constructing state vectors includes constructing a state vector in the topological vector space for each word using the dictionary and the basis; and
   the method further comprises filtering the state vectors.

6. A computer-readable medium containing a program to construct a single vector representing a semantic abstract in a topological vector space for a semantic content of a document on a computer system, the program comprising:
   storing a semantic content for the document in computer memory accessible by the computer system;
   identifying a directed set of concepts as a dictionary, the directed set including a maximal element at least one concept, and at least one chain from the maximal element to every concept;
   selecting a subset of the chains to form a basis for the dictionary;
   identifying lexemes/lexeme phrases in the semantic content;
   measuring how concretely each lexemes/lexeme phrase is represented in each chain in the basis and the dictionary;
   constructing state vectors in the topological vector space for the semantic content using the measures of how concretely each lexemes/lexeme phrase is represented in each chain in the dictionary and the basis;
   superpositioning the state vectors to construct the single vector; and
   storing the single vector as the semantic abstract for the document.

7. A computer-readable medium according to claim 6, wherein superpositioning the state vectors includes adding the state vectors using vector arithmetic.

8. A computer-readable medium according to claim 6, wherein superpositioning the state vectors includes weighing the state vectors.

9. A computer-readable medium according to claim 6, the program further implementing normalizing the single vector.

10. A computer-readable medium according to claim 6, wherein:
    storing the semantic software includes:
       storing the document in computer memory accessible by the computer system; and
       extracting words from at least a portion of the document;
    constructing state vectors includes constructing a state vector in the topological vector space for each word using the dictionary and the basis; and
    the program further implements filtering the state vectors.

11. An apparatus on a computer system to construct a single vector representing a semantic abstract in a topological vector space for a semantic content of a document on a computer system, the apparatus comprising:
    a semantic content stored in a memory of the computer system;
    a lexeme identifier adapted to identify lexemes/lexeme phrases in the semantic content;
    a state vector constructor for constructing state vectors in the topological vector space for each lexeme/lexeme phrase identified by the lexeme identifier, the state vectors measuring how concretely each lexeme/lexeme phrase identified by the lexeme identifier is represented in each chain in a basis and a dictionary, the dictionary including a directed set of concepts including a maximal element and at least one chain from the maximal element to every concept in the directed set, the basis including a subset of chains in the directed set; and a superpositioning unit adapted to superposition the state vectors into a single vector as the semantic abstract.

12. An apparatus according to claim 11, wherein:
the state vector includes an associated threshold distance; and
the apparatus further comprises:
search means for searching the topological vector space for a second document with a second semantic abstract within the threshold distance associated with the first semantic abstract for the first document; and
retrieval means to retrieve the second document.

13. An apparatus according to claim 11, wherein the superpositioning unit includes a vector arithmetic unit adapted to add the state vectors.

14. An apparatus according to claim 11 further comprising a normalization unit adapted to normalize the single vector.

15. An apparatus according to claim 11, wherein:
the apparatus further comprises:
a lexeme extractor adapted to extract lexemes/lexeme phrases from the semantic content; and
filtering means for filtering the state vectors; and
the state vector constructor is adapted to constructing a state vector in the topological vector space for each lexeme/lexeme phrase using the dictionary and the basis.

16. A computer-implemented method for constructing minimal vectors representing a semantic abstract in a topological vector space for a semantic content of a document on a computer system, the method comprising:
storing a semantic content for the document in computer memory accessible by the computer system;
identifying a directed set of concepts as a dictionary, the directed set including a maximal element at least one concept, and at least one chain from the maximal element to every concept;
selecting a subset of the chains to form a basis for the dictionary;
identifying lexemes/lexeme phrases in the semantic content;
measuring how concretely each lexemes/lexeme phrase is represented in each chain in the basis and the dictionary;
constructing state vectors in the topological vector space for the semantic content using the measures of how concretely each lexemes/lexeme phrase is represented in each chain in the dictionary and the basis;
locating clumps of state vectors in the topological vector space;
superpositioning the state vectors within each clump to form a single vector representing the clump;
collecting the single vectors representing each clump to form the minimal vectors; and
storing the minimal vectors as the semantic abstract for the document.

17. A computer-readable medium containing a program to construct minimal vectors representing a semantic abstract in a topological vector space for a semantic content of a document on a computer system, the program executable by a computer and implementing:
storing a semantic content for the document in computer memory accessible by the computer system;
identifying a directed set of concepts as a dictionary, the directed set including a maximal element at least one concept, and at least one chain from the maximal element to every concept;
selecting a subset of the chains to form a basis for the dictionary;
identifying lexemes/lexeme phrases in the semantic content;
measuring how concretely each lexemes/lexeme phrase is represented in each chain in the basis and the dictionary;
constructing state vectors in the topological vector space for the semantic content using the measures of how concretely each lexemes/lexeme phrase is represented in each chain in the dictionary and the basis;
locating clumps of state vectors in the topological vector space;
superpositioning the state vectors within each clump to form a single vector representing the clump;
collecting the single vectors representing each clump to form the minimal vectors; and
storing the minimal vectors as the semantic abstract for the document.

18. An apparatus on a computer system to construct minimal vectors representing a semantic abstract in a topological vector space for a semantic content of a document on a computer system, the apparatus comprising:
a semantic content stored in a memory of the computer system;
a state vector constructor for constructing state vectors in the topological vector space for each lexeme/lexeme phrase in the semantic content the state vectors measuring how concretely each lexeme/lexeme phrase is represented in each chain in a basis and a dictionary, the dictionary including a directed set of concepts including a maximal element and at least one chain from the maximal element to every concept in the directed set, the basis including a subset of chains in the directed set;
a clump locator unit adapted to locate clumps of state vectors in the topological vector space;
a superpositioning unit adapted to superposition the state vectors within each clump into a single vector representing the clump; and
a collection unit adapted to collect the single vectors representing the clump into the minimal vectors of the semantic abstract.

19. A method according to claim 1, further comprising storing the single vector as the semantic abstract for the document.

20. A method according to claim 1, further comprising storing the minimal vectors as the semantic abstract for the document.

21. An apparatus, comprising:
means for storing a semantic content for a document in computer memory accessible by a computer system;
means for identifying a directed set of concepts as a dictionary, the directed set including a maximal element at least one concept, and at least one chain from the maximal element to every concept;
means for selecting a subset of the chains to form a basis for the dictionary;
means for identifying lexemes/lexeme phrases in the semantic content;
means for measuring how concretely each lexemes/lexeme phrase is represented in each chain in the basis and the dictionary;
means for constructing state vectors in the topological vector space for the semantic content using the measures of how concretely each lexemes/lexeme phrase is represented in each chain in the dictionary and the basis;
means for locating clumps of state vectors in the topological vector space;

means for superpositioning the state vectors within each clump to form a single vector representing the clump;

means for collecting the single vectors representing each clump to form the minimal vectors; and means for storing the minimal vectors as the semantic abstract for the document.

* * * * *

UNITED STATES PATENT AND TRADEMARK OFFICE
CERTIFICATE OF CORRECTION

| | | |
|---|---|---|
| PATENT NO. | : 7,389,225 B1 | Page 1 of 1 |
| APPLICATION NO. | : 09/691629 | |
| DATED | : June 17, 2008 | |
| INVENTOR(S) | : Delos C. Jensen et al. | |

It is certified that error appears in the above-identified patent and that said Letters Patent is hereby corrected as shown below:

Column 4, line 50, the word "T" should read -- $\Sigma$ --;
Column 7, line 60, the word "determined" should read -- determine --;
Column 8, line 12, claim 6, the words "containing a program" should read -- storing a computer program --;
Column 8, line 15, claim 6, the words "the program comprising:" should read -- the program executable by a computer and implementing: --;
Column 8, line 18, claim 6, the word "identifing" should read -- identifying --;
Column 8, line 24, claim 6, the word "idnetifing" should read -- identifying --;
Column 8, line 45, claim 10, the words "the semantic software" should read -- a semantic content --;
Column 9, lines 55-56, claim 16, the words "storing the minimal vectors as the semantic abstract for the document." should read -- comparing the minimal vectors with a second semantic abstract for a second document to determine whether the second document is semantically close to the document.";
Column 9, line 57, claim 17, the word "containing" should read -- storing --;
Column 9, line 64, claim 17, the word "identifing" should read -- identifying --;
Column 10, line 3, claim 17, the word "identifing" should read -- identifying --;
Column 10, line 45, claim 20, the words "claim 1" should read -- claim 16 --.

Signed and Sealed this

Thirtieth Day of March, 2010

David J. Kappos
*Director of the United States Patent and Trademark Office*